Oct. 17, 1967   R. K. PHILLIPS   3,347,102
METHOD AND APPARATUS FOR SAMPLING COTTON
Filed May 6, 1965   3 Sheets-Sheet 1

INVENTOR
RUFUS K. PHILLIPS

BY Newton, Hopkins, Jones & Ormsby

ATTORNEYS

INVENTOR
RUFUS K. PHILLIPS

BY Newton, Hopkins, Jones & Ormsby

ATTORNEYS

Oct. 17, 1967   R. K. PHILLIPS   3,347,102
METHOD AND APPARATUS FOR SAMPLING COTTON
Filed May 6, 1965   3 Sheets-Sheet 3
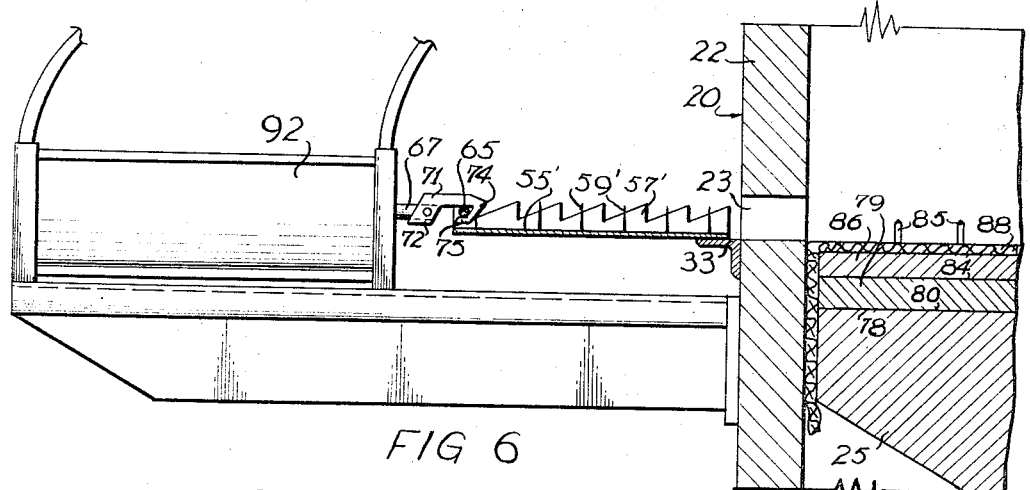
FIG 6
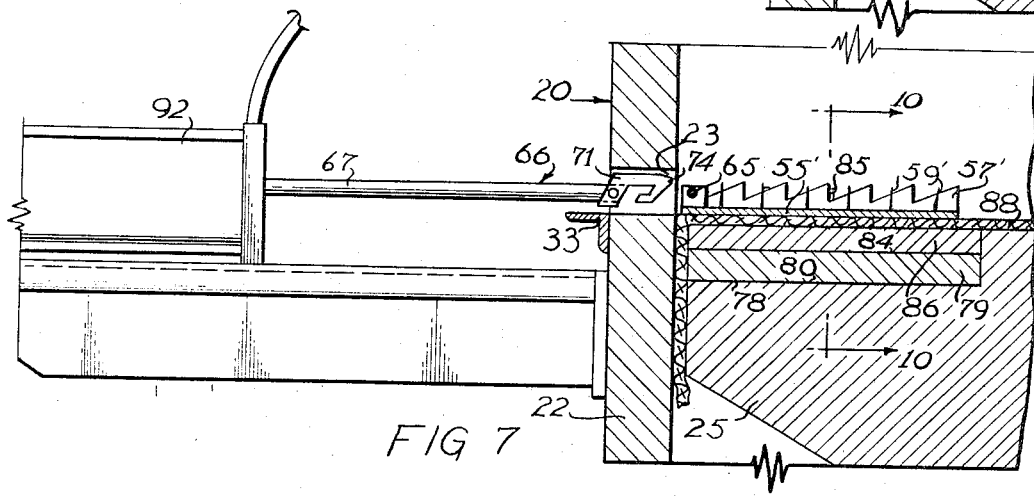
FIG 7
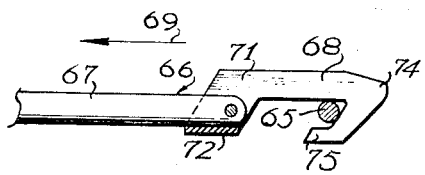
FIG 8
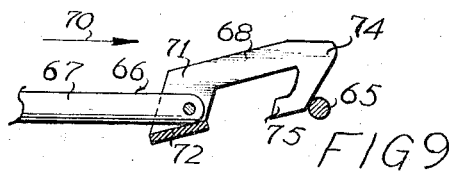
FIG 9
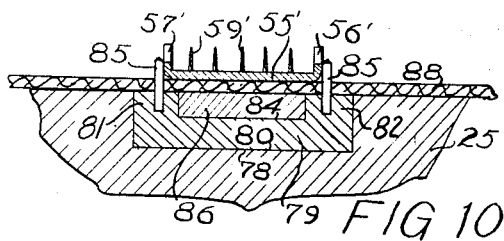
FIG 10
FIG 11
INVENTOR
RUFUS K. PHILLIPS
BY Newton, Hopkins, Jones & Ormsby
ATTORNEYS

United States Patent Office 3,347,102
Patented Oct. 17, 1967

3,347,102
METHOD AND APPARATUS FOR
SAMPLING COTTON
Rufus K. Phillips, Sugar Land, Tex., assignor to Continental/Moss-Gordin, Inc., Prattville, Ala., a corporation of Delaware
Filed May 6, 1965, Ser. No. 453,653
13 Claims. (Cl. 73—423)

ABSTRACT OF THE DISCLOSURE

Method and apparatus for sampling cotton from a bale of cotton during the baling process. A sampling tray is positioned inside the baler, the cotton compressed by the baler so that a portion enters the sampling tray, and the sampling tray is removed from the baler carrying a predetermined amount of cotton from the bale. The sampling tray includes a plurality of pins which impale the cotton.

Background of the invention

In the textile industry it is common knowledge that the quality of the final product depends largely upon the quality of the raw material initially used to form the product. Thus, it is necessary to exert a certain amount of quality control over the raw material selected for the manufacture of a product to maintain the various quality standards set by the industry. When manufacturing cotton products, the method generally used in the past to maintain knowledge of the quality of cotton to be used to form a product has been to cut out small samples from different areas of a bale of cotton so that a test of random portions of a bale of cotton can be made. While this method of sampling different portions of a bale of cotton is somewhat successful to the extent that adequate knowledge is usually gained of the general quality of cotton in the bale, such a method requires a laborer to go from bale to bale with a sharp instrument, such as a knife, and take the random samples of cotton from the bales. Of course, taking samples from the bales in this manner results in each sample being of no particular size or shape and from no particular area of the bale of cotton. In other words, the laborer making the samples might cut or tear all of his samples from the same area of the bale or take a sample too large or too small for the required purpose so that some of the cotton in the bale is wasted or the sample is too small to be adequately tested.

Summary of the invention

This invention comprises a method and apparatus for sampling bales of cotton so that the samples are taken from exact, predetermined areas of the bales, and every sample taken is of substantially the same quantity and shape.

Accordingly, it is an object of this invention to provide a method and apparatus for accurately and dependably removing small portions of cotton from a bale of cotton.

Another object of this invention is to provide a method and apparatus for taking small portions of cotton from a bale of cotton so that the small portions are substantially equal in quantity, similar in shape, and are taken from predetermined locations from the bale.

It is another object of this invention to provide a method and apparatus to take samples of cotton from a bale of cotton, automatically, economically and expeditiously.

Brief description of the drawing

Numerous other objects, features and advantages of the present invention will be apparent from consideration of the following specification, taken in conjunction with the accompanying drawing, in which:

FIG. 6 is a partial cross-sectional view of a lower sampling apparatus of another form of the invention showing the cutter tray withdrawn from the baling press;

FIG. 7 is a partial cross-sectional view similar to FIG. 6, but showing the cutter tray positioned on the press ram;

FIG. 8 is a partial elevational view of the retrieving hook utilized on the lower sampling apparatus of both forms of the present invention, showing the hook engaged with the catch pin of the cutter tray;

FIG. 9 is a partial elevational view of the retrieving hook, similar to FIG. 8, but showing the method in which the hook engages the catch pin of the cutter tray;

FIG. 10 is a partial cross-sectional view of the upper portion of the baling press ram, along lines 12—12 of FIG. 7, showing the cutter tray in position on the baling press ram; and FIG. 11 is a perspective view of a lower cutter tray.

Description of an embodiment

Figure 1:
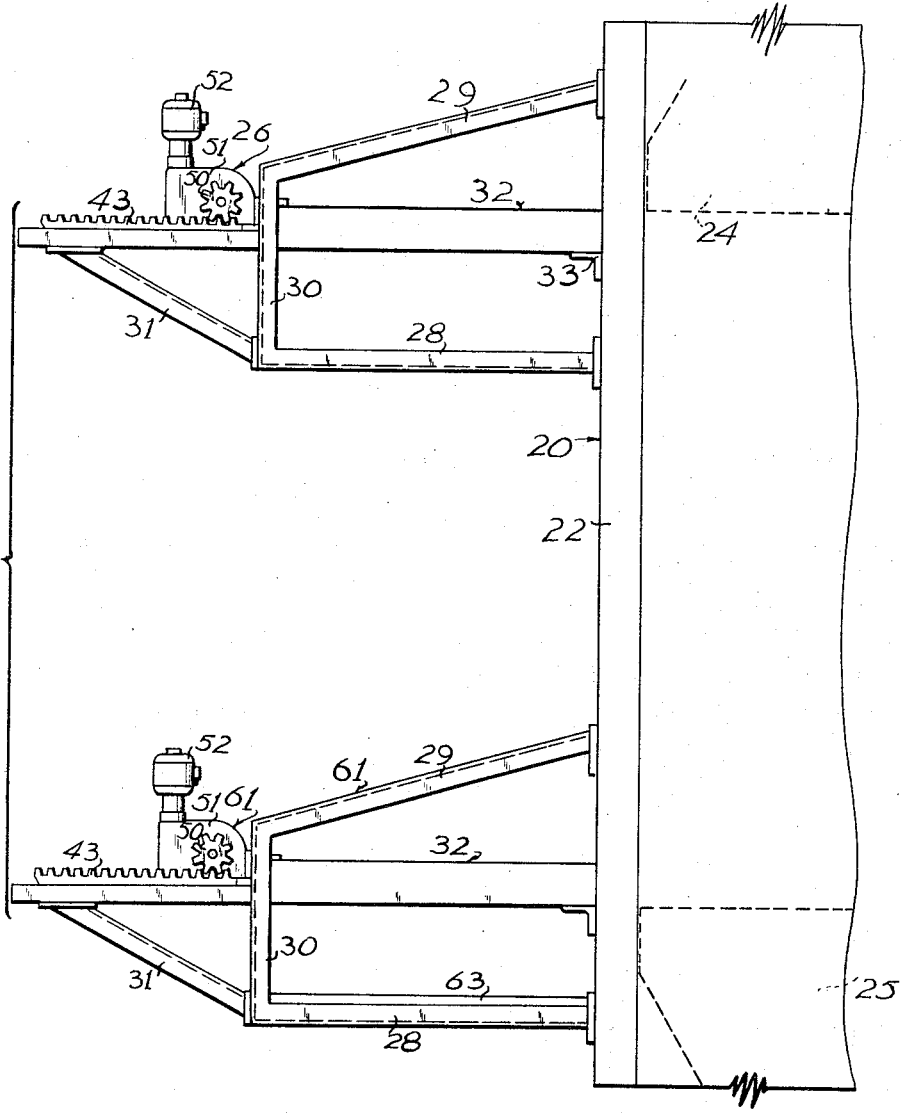
FIG. 1 is a partial elevational view of a door of a cotton baling press, showing apparatus for taking samples from the upper and lower portion of the bale of cotton attached thereto.
Figure 2:
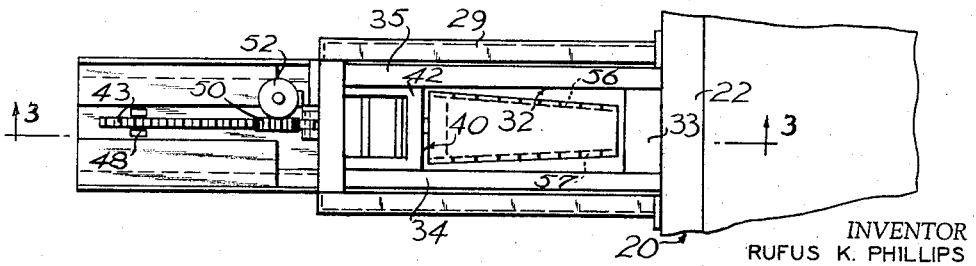
FIG. 2 is a plan view of the cotton sampling apparatus mounted on the upper portion of the door of the baling press.

Referring now more particularly to the drawings, FIG. 1 shows a portion of a baling press 20 having a door or wall portion 22 on one side defining apertures 21 and 23, and a sill 24 at the top thereof. The baling press is of the conventional design and constructed so that it is filled with loose cotton and a ram is actuated to compress the cotton into a traditional bale so that it can be easily handled for shipping and storage. As with other baling machines, the baling press is constructed so that bagging material is covered over certain portions of the cotton as it is baled and metal straps are wrapped around the bale to hold the cotton in a compressed state.

Mounted at the upper portion of the baling press 20 on the door 22 is the upper sampling mechanism 26. The upper sampling mechanism is supported on the door 22 by the support beams 28 and 29 extending generally horizontally out from the door or wall portion 22. Vertical support beams 30 join the support beams 28 and 29 at their extremities, and the angled support beams 31 are supported from the juncture between the support beams 28 and support beams 30.

Figure 3:
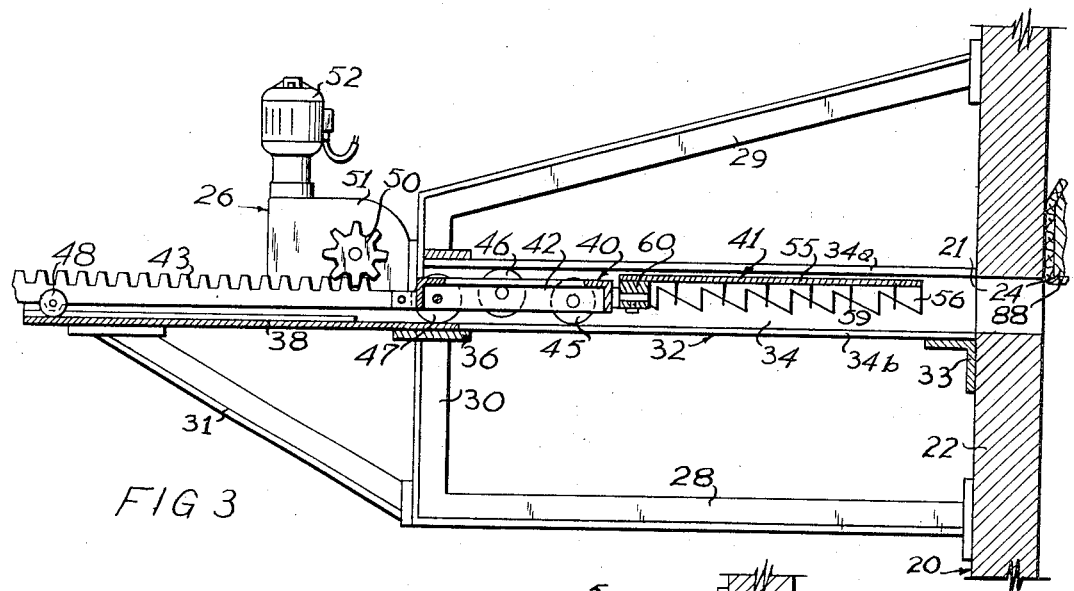
FIG. 3 is a cross-sectional view of the upper sampling mechanism, taken along lines 3—3 of FIG. 2, showing the cutter tray withdrawn from the press.
Figure 4:
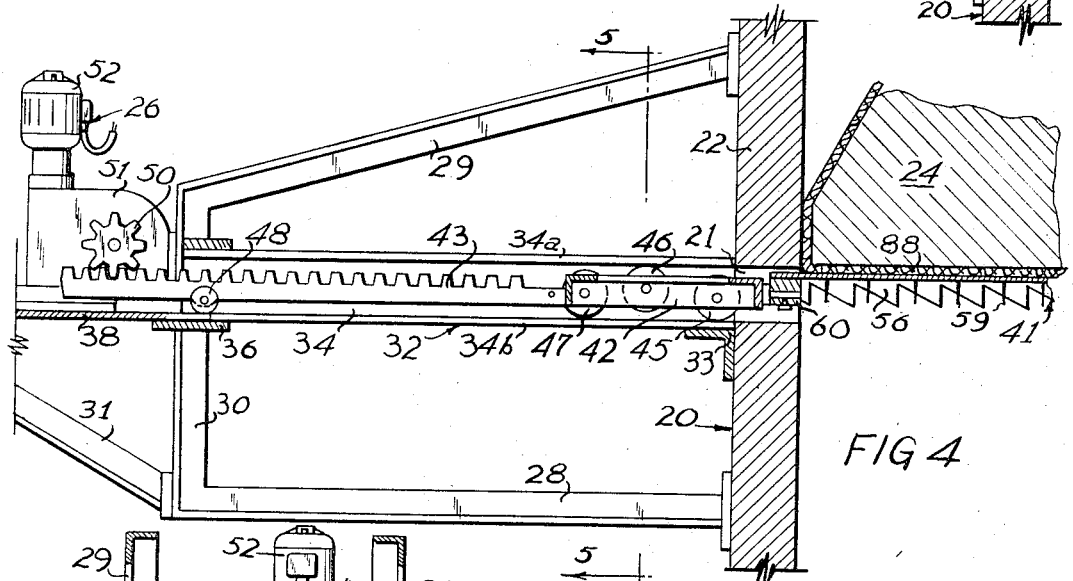
FIG. 4 is a view of the upper sampling apparatus, similar to FIG. 3, but with the cutter tray inserted in the press.
Figure 5:
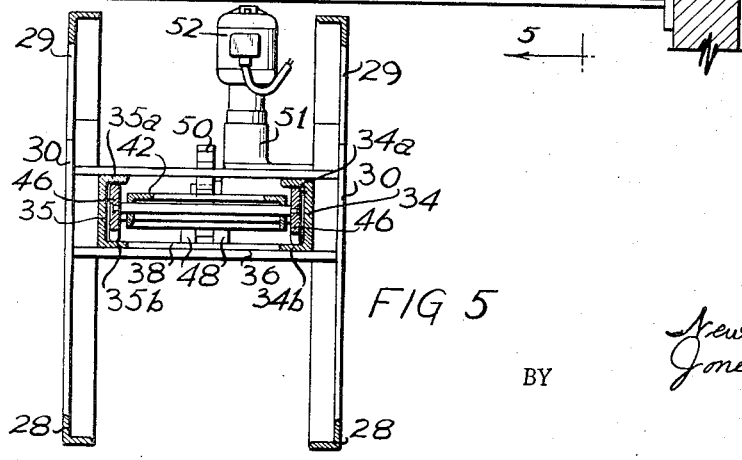
FIG. 5 is a cross-sectional view of the upper sampling apparatus, taken along lines 5—5 of FIG. 4.

As is best shown in FIG. 3, an integral track 32 is supported by the support beams 28–31 and the angle iron 33 attached to the door 22. The integral track 32 comprises U-shaped beams 34 and 35 which are positioned parallel to each other. The U-shaped beams 34 and 35 are arranged so that their flanged portions 34a, 34b, 35a and 35b extend toward each other and form a track which will be later more fully described. The U-shaped beams are supported at their ends remote from the baling press by the support platform 36 which is supported by the vertically extending support members 30. The support platform 36 also supports a guide tray 38 which forms an extension of the surfaces formed by the flanged portions 34b and 35b of the U-shaped beams 34 and 35. The guide tray 38 is supported at its end remote from the U-shaped beams 34 and 35 by the angled support members 31.

The integral track 32 is arranged to support a movable cutter tray mechanism 40 which is arranged to be selectively inserted into the baling press 20. The cutter tray mechanism 40 comprises a cutter tray 41, a bearing guide 42 and a rack 43. The bearing guide 42 is rectangular in shape and has sets of roller bearings 45, 46 and 47, which are arranged to roll on the flanged surfaces of the U-shaped beams 34 and 35. The sets of roller bearings 45 and 47 are located at the ends of the bearing guide 42 and are arranged to roll on the flanged portions 34b and 35b of the U-shaped beams 34 and 35. The set of roller bearings 46 is arranged to bear against the flanged portions 34a and 35a of the U-shaped beams 34 and 35 respectively. With this arrangement it will be seen that the bearing guide 42 will be free to move toward and away from the baling press 20, and will be restricted from movement in any other direction.

The cutter tray 41 is attached to the bearing guide at its end closest to the baling press. The rack 43 is attached to the bearing guide 42 at its end remote from the baling press 20. A set of roller bearings 48 is attached to the rack 43 at its end remote from the bearing guide 42. The roller bearings 48 are arranged to engage the upper surface of the guide tray 38 in a similar manner to the sets of roller bearings 45 and 47 of the bearing guide 42. Since the guide tray 38 is coextensive with the flanged portions 34b and 35b of the U-shaped beams 34 and 35, respectively, the sets of bearings 45, 46, 47, and 48 will permit smooth movement of the bearing guide 42 and the rack 43 in the directions toward and away from the baling press 20. A pinion 50 is mounted in a gear box 51 and is driven by the reversible electric motor 52. With this arrangement, it can be seen that actuation of the electric motor will cause rotation of the pinion 50 which will cause the rack 43, bearing guide 42, and cutter tray 41 to move toward or away from the baling press 20.

The cutter tray 41, as is best shown in FIGS. 3, 10 and 11, has a substantially flat base portion 55 which has its edges upturned at 56 and 57. The edges 56 and 57 converge toward each other and are serrated so that saw-like blades extend toward the bearing guide 42. A plurality of sharpened pins 59 are mounted in the base 55 of the cutting tray 41, and extend perpendicularly from said base. The cutter tray 41 of the upper sampling mechanism 26 is connected to bearing guide 42 at 60. The cutter tray of the upper sampling mechanism 26 is faced in a downward direction so that when the cutter tray is inserted into the baling press the base 55 of the cutter tray will be juxtaposed the sill 24 of the baling press 20, and the pressure exerted on the cotton in the press will force the flat base 55 against the sill 24.

A lower sampling mechanism 61 is attached to the door 22 of the baling press 20 beneath the upper sampling mechanism 26 in a manner similar to the upper sampling mechanism. The lower sampling mechanism 61 is positioned at the point at which the press ram 25 will come to rest after the loose cotton has been compressed. While the lower sampling mechanism 61 is constructed in a manner generally similar to the upper sampling mechanism 26, the lower sampling mechanism 61 has its cutter tray 62 inverted so that the pins 59' and the serrated edge portions 56' and 57' extend upwardly from the base 55'. Also, the cutter tray 62 of the lower sampling mechanism 61 is not permanently attached to its bearing guide and a cutter tray retrieving table 63 is supported by the lower support members 28. As is best shown in FIG. 11, the cutter tray 62 has portions 56a and 57a of its edge portions 56' and 57' constructed to support a catch pin 65, therebetween, which is slightly displaced from the base 55' of the cutter tray 62.

A retrieving hook 66 comprising a shaft 67 and a hook 68 is arranged to engage the cutter tray catch pin 65. The retrieving hook 66 is arranged to be moved in the direction of the arrows 69 and 70. The hook 68 has a base portion 71, a flange portion 72, a slanted nose portion 74 and a tip portion 75. The flange 72 is arranged to engage the shaft 67 so that the hook 68 will not pivot in a clockwise direction further than that position shown in FIG. 8. It can be seen that when the catch pin 65 is engaged by the hook 68 and the shaft 67 is pulled in the direction of the arrow 69, the hook mechanism 66 will cause the catch pin and cutter tray 62 to move in the direction of the arrow 69. On the other hand, when the hook is not engaged with the catch pin 65, movement thereof in the direction of arrow 70 of FIG. 9 will cause the slanted nose portion 72 of the hook to ride up over the catch pin 65 until the tip portion 75 slips over the catch pin 65, whereupon the hook 68 will drop over the catch pin.

As is best shown in FIGS. 7 and 10, the press ram 25 has a grooved portion 78 near its edge adjacent the door 22. A stationary tray 79 is inserted into the grooved portion, and has a base 80 and upwardly extending flanged portions 81 and 82. The flanged portions extend up to the level of the surface of the press ram 25, and define a shallow area 84 therebetween. The flanged portions 81 and 82 of the tray 79 have a series of pins 85 embedded therein. The shallow area 84 of the tray 79 holds a magnetised substance 86 which is dimensioned to be contained within the tray 79 and be coextensive with the surface of the press ram 25. The pins 85 are slightly sharpened at their ends so that bagging material 88 of a type usually used in cotton baling presses can be inserted thereover to lie flat over the face of the press ram 25. The cutter tray 62 can then be mounted between the rows of pins 85 so that each pin bears against the edge portions 56' or 57' of the cutter tray 55 and the magnetised substance 86 tends to hold the cutter tray firmly against the surface of the press ram 25. With this arrangement, it can be seen that the cutter tray will be firmly and accurately positioned on the surface of the press ram with little bother or attention from an attendant.

*Operation*

When operating the cotton sampling mechanism, bagging material is usually placed over the surface of the press ram 25 and immediately beneath the sill 24. A cutter tray is then positioned between the rows of pins 57 on the surface of the press ram 25 so that it is in its exact predetermined position, and held therein by the magnetised substance 86 in the surface of the press ram 25. The cutter tray 41 of the upper sampling mechanism 26 is inserted through the aperture 21 of the door by actuation of the electric motor 52 so that its base 55 is in juxtaposition with the sill 24. The baling press 20 is then filled with cotton which is not yet compressed to its final desired density, whereupon the press ram 25 moves in an upward direction until it reaches the position shown in the dotted lines of FIG. 1, whereupon the cotton within the baling press 20 is compressed to its desired density and shape.

At this point, the upper sampling mechanism 26 is actuated by energization of the electric motor 52, which rotates the pinion 50 in a clockwise direction to cause the cutter mechanism 40 to move to the left as viewed in FIG. 3, through the aperture 21 so that the cutter tray is withdrawn from the baling press 20. As the cutter tray 41 is withdrawn from the baling press 20, it can be seen that the serrated edge portions 56 and 57 will have a sawing action on that portion of the cotton coming into contact therewith, so that it will tend to separate a section of cotton from the bale. Also, the pins 59 will have been embedded in the cotton since the press ram 25 will have forced the cotton against the cutter tray 41 so that the cotton will be impaled on the pins 59.

As the cutter tray 41 is withdrawn from the baling press 20, the pins 59 will tend to prevent the cotton impaled thereon from sliding off the cutter tray, and since the pins 59 and the serrated edge portions 56 and 57 are of substantially equal height from the base 55 of the cutter tray, it can be seen that when the cutter tray is withdrawn from the bale of cotton, it will tend to carry a slab of cotton of a dimension approximately equal to the interior portion of the cutter tray defined between its edge portions 56 and 57. Thus, it can be seen that the withdrawal of the cutter tray will cause a predetermined amount of cotton to be severed from the bale of cotton, which will be at approximately the same density as the bale of cotton.

When the press ram 25 has reached its predetermined position, as shown in the dotted lines of FIG. 1, the lower sampling mechanism 61 can be energized by its motor so that the pinion will rotate to cause the rack to move the retrieving hook 66 toward the aperture 23 of the door or wall portion 22 of the baling press 20. As the retrieving hook 66 moves through the aperture 23, it engages the catch pin 65 of the lower cutter tray 62, as illustrated in FIG. 9, whereupon reversing the motor and rotation of the pinion will cause the rack, retrieving hook and cutter tray to be moved to the left as shown in FIG. 1. This results in the withdrawal of the cutter tray through the aperture 23 of the door 22 of the baling press 20.

Since the action of the press ram 25 in its upward compression movement causes the cotton inside the baling press 20 to be impaled on the pins 59 of both the upper and lower cutter trays, the action of the cutter tray 62 of the lower sampling mechanism 61 will be substantially the same as the cutter tray 41 of the upper sampling mechanism 26, so that equal amounts of cotton will be withdrawn from each end of the bale of cotton.

As the cutter tray 62 of the lower sampling mechanism 61 is withdrawn from the baling press 20, the retrieving hook will pull the cutter tray toward the left as viewed in FIG. 1 until the inner edge of the cutter tray slides past the angle arm 33, whereupon the cutter tray will fall by gravity toward the cutter tray retrieving table 63. As the inner edge of the cutter tray 62 falls toward the table 90, it can be seen that the tip 75 of the retrieving hook 66 is shaped in a manner so that the action of the inner edge of the cutter tray falling toward the table 63 will cause the catch pin 65 of the cutter tray to slip from the grasp of the retrieving hook, so that the outer end of the cutter tray will also fall toward the table 63. Accordingly, the cutter tray will come to rest on the surface of the retrieving table 63 after the retrieving hook has been moved to the left as viewed in FIG. 1, to its furtherest extent.

At this point, the cutter tray can be retrieved from the table 63, the cotton removed therefrom, and the cutter tray repositioned on the press ram 25 when said ram is lowered to its position for loading the baling press with cotton. Also, the operator of the baling press can remove the cotton from the cutter tray 41 of the upper sampling mechanism 26 by merely reaching between the support beams 28 and pulling the cotton sample downward therefrom. The operator can use a suitable tool for this purpose, or if desired, the support beams 28 and 30 can house a stripping mechanism that will extend in between the rows of pins 59 to strip the cotton sample from the cutter tray of the upper sampling mechanism 26 upon the withdrawal of the cutter tray from the baling press 20.

While the invention has been disclosed as embodying electrically actuated sampling mechanisms, it should be obvious that hydraulic or pneumatic means can be utilized to operate either or both sampling mechanisms. For instance, FIGS. 6 and 7 show a lower sampling mechanism that is actuated by a hydraulic ram 92. Also, electrical indicating means can be easily incorporated with the system to indicate when the ram 25 is in its up position so that the sampling mechanisms can be either selectively or automatically actuated.

With this method of taking samples of cotton from bales of cotton as it is baled, it can be seen that the samples will be removed from each bale of cotton at a precise point from the bale, and an exact volume of sample will be obtained from each bale so that an excess of cotton will not be removed from the bale. Also, each sample will obtain enough cotton to be adequately tested for quality and the density of the sample will indicate the density of the bale. Furthermore, such a method of sampling cotton bales has the advantage of earmarking the bales of cotton to a minor extent so that each bale can be inspected at a precise position to determine whether it has had a sample removed therefrom. This, of course, provides a manner in which each bale can be inspected to determine the removal or nonremoval of a sample without hazard of mistake.

Since each sample is removed in a compressed state and in a precise size, it can be seen that the samples can be easily packaged and stored to await testing, or for shipment to a remote point. This, of course, is convenient in that the possibilities of confusing the various samples are more remote than those in previously used methods, and the handling of the samples is more economical and expedient.

It will be obvious to those skilled in the art that many variations may be made in the embodiments chosen for the purpose of illustrating the present invention without departing from the scope thereof as defined by the appended claims.

I claim:
1. Apparatus for taking samples of cotton from a bale of cotton as it is baled comprising:
    (A) a baling press including:
        (1) an enclosure having vertically extending walls, one of said walls defining upper and lower apertures;
        (2) a sill mounted above and perpendicular to said walls;
        (3) a ram reciprocally received within said enclosure and arranged to reciprocate between predetermined upper and lower positions;
    (B) an upper sampling mechanism including:
        (1) support means attached to said one of said walls in the vicinity of said upper aperture;
        (2) a track means supported by said support means and positioned in alignment with said upper aperture;
        (3) guide means reciprocally received by said track means;
        (4) a cutter tray connected to said guide means, comprising:
            (a) a base portion;
            (b) serrated edge portions perpendicularly disposed with said base portion in one direction;
            (c) a plurality of pins projecting perpendicularly from said base portion in said one direction;
        (5) means for reciprocating said guide means and said cutter tray along said track means and said cutter tray through said upper aperture;
    (C) a lower sampling mechanism including:
        (1) a support means attached to said one of said walls in the vicinity of said lower aperture;
        (2) a track means supported by said support means and positioned in alignment with said lower aperture;
        (3) guide means reciprocally received by said track means;
        (4) a cutter tray comprising:
            (a) a base portion;
            (b) serrated edge portions perpendicularly disposed with said base portion in a direction opposite to said one direction;
            (c) a plurality of pins projecting perpendicularly from said base in said direction opposite to said one direction;
            (d) a catch pin extending between said serrated edge portions;

(5) means for positioning said cutter tray in a predetermined position on said ram in its said lower position;

(6) retrieving means for removing said cutter tray from said lower ram through said lower aperture when said ram is in its said upper position.

2. A device for taking samples of cotton from a bale of cotton comprising a substantially flat base portion having upturned edges along two of its opposite sides, said edges being serrated, a plurality of pins extending upwardly from said base portion.

3. A device for taking samples of a substance from a compressed mass of said substance comprising a substantially flat tray having a base portion and two opposed upwardly turned edge portions, a pin extending between said opposed edge portions at one end thereof and said edge portions converging toward each other along their lengths away from said one end.

4. A device for taking samples of a substance from a compressed mass of said substance as described in claim 3 wherein said opposed edge portions are serrated.

5. A device for taking samples of a substance from a compressed mass of said substance comprising a substantially flat four-sided tray having a base portion and two opposed edge portions extending perpendicularly of said base portion in one direction, said tray having means for severing a portion of said substance from said mass of said substance.

6. A device for taking samples of a substance from a compressed mass of said substance as set forth in claim 5 wherein said means comprises a plurality of pins extending from said base portion in said one direction.

7. A device for taking samples of a substance from a compressed mass of said substance as set forth in claim 5 wherein said means comprises said opposed edge portions progressively converging toward each other along their lengths.

8. A device for taking samples of a substance from a compressed mass of said substance as set forth in claim 5 wherein said means comprises said edge portions being serrated.

9. A method of taking samples of cotton from a bale of cotton comprising placing a first cutting means in a baling press at its upper portion, placing a second cutting means on the press of said baling press, compressing a mass of cotton in said baling press, withdrawing said first cutting means from said baling press and withdrawing said second cutting means from said baling press.

10. A method of taking samples of cotton from a bale of cotton comprising placing a sampling means next adjacent a sill of a baling press, compressing a mass of cotton in said baling press and withdrawing said sampling means from said baling press in a direction parallel to the surface of the sill.

11. A method of taking samples of cotton from a bale of cotton comprising placing a sampling means on the press of a baling press, compressing a mass of cotton in said baling press and withdrawing said sampling means from said baling press.

12. Apparatus for taking samples of cotton from a bale of cotton during the baling operation comprising
a baling press including a side wall member defining at least one aperture, sampling means connected to said side wall member and including a sample retrieving member, means for inserting and removing said sample retrieving member through said aperture with a rectilinear movement generally normal to said wall member.

13. The invention of claim 12 wherein said sample retrieving member includes impaling members for engaging a portion of the cotton in said baling press and cutting members for cutting any cotton impaled on said impaling members away from the remaining cotton in the bale.

References Cited

UNITED STATES PATENTS

| 158,985 | 1/1875 | Schultz | 73—425 |
| 1,065,456 | 6/1913 | Lowry | 7—14.3 X |
| 2,024,076 | 12/1935 | Thomas | 73—425 X |
| 2,459,383 | 1/1949 | Levy | 73—421 |
| 3,272,456 | 9/1966 | Cooley | 294—82 |

FOREIGN PATENTS 141,337   2/1962   U.S.S.R.

LOUIS R. PRINCE, *Primary Examiner.*

S. C. SWISHER, *Assistant Examiner.*